(12) United States Patent
Bunsmann

(10) Patent No.: US 7,770,958 B2
(45) Date of Patent: Aug. 10, 2010

(54) SOFT TOP FOR A MOTOR VEHICLE

(75) Inventor: Winfried Bunsmann, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 840 days.

(21) Appl. No.: 10/558,697

(22) PCT Filed: May 21, 2004

(86) PCT No.: PCT/DE2004/001064

§ 371 (c)(1),
(2), (4) Date: Feb. 22, 2007

(87) PCT Pub. No.: WO2004/108455

PCT Pub. Date: Dec. 16, 2004

(65) Prior Publication Data

US 2007/0296241 A1     Dec. 27, 2007

(30) Foreign Application Priority Data

May 30, 2003    (DE)    ................. 103 24 756

(51) Int. Cl.
*B60J 7/10*    (2006.01)
(52) U.S. Cl. .................. 296/121; 296/218; 296/219
(58) Field of Classification Search ............ 296/107.01, 296/107.09, 107.12, 121, 107.04, 218, 219, 296/224

See application file for complete search history.

(56) References Cited

U.S. PATENT DOCUMENTS

| | | | | |
|---|---|---|---|---|
| 3,348,877 A | * | 10/1967 | Caramanna | 135/88.09 |
| 3,494,659 A | * | 2/1970 | Trenkler | 296/218 |
| 3,658,378 A | | 4/1972 | Claude | |
| 4,552,401 A | * | 11/1985 | Trenkler | 296/219 |
| 4,801,173 A | * | 1/1989 | Trenkler | 296/218 |
| 4,830,425 A | * | 5/1989 | Muscat | 296/121 |
| 5,080,428 A | * | 1/1992 | Rouland | 296/218 |
| 5,267,774 A | * | 12/1993 | Garner et al. | 296/218 |
| 5,499,855 A | * | 3/1996 | Andres et al. | 296/121 |
| 5,992,917 A | * | 11/1999 | Hilliard et al. | 296/103 |
| 6,786,529 B2 | * | 9/2004 | Hasselgruber et al. | 296/108 |
| 7,121,619 B2 | * | 10/2006 | Henderson et al. | 296/218 |
| 7,185,941 B2 | * | 3/2007 | Klein et al. | 296/121 |

(Continued)

FOREIGN PATENT DOCUMENTS

DE     2 032 144     6/1970

(Continued)

*Primary Examiner*—Glenn Dayoan
*Assistant Examiner*—Gregory Blankenship
(74) *Attorney, Agent, or Firm*—Rothwell, Figg, Ernst & Manbeck, P.C.

(57)     ABSTRACT

Disclosed is a soft top for a motor vehicle, comprising longitudinal struts that span a roof opening and a flexible roof skin which spans the width of the vehicle and is fastened to a windshield frame in the front and a bow spanning the width of the vehicle in the rear in the mounted state. One respective longitudinal strut that delimits the roof skin in the transversal direction of the vehicle is embodied as a lateral rail which can be connected at least to one lateral vehicle element. In order to put the soft top down, it can be folded in the transversal direction of the vehicle, the roof skin and the longitudinal struts being joined so as to form a pre-assembled unit.

9 Claims, 4 Drawing Sheets

U.S. PATENT DOCUMENTS

Figure 1:
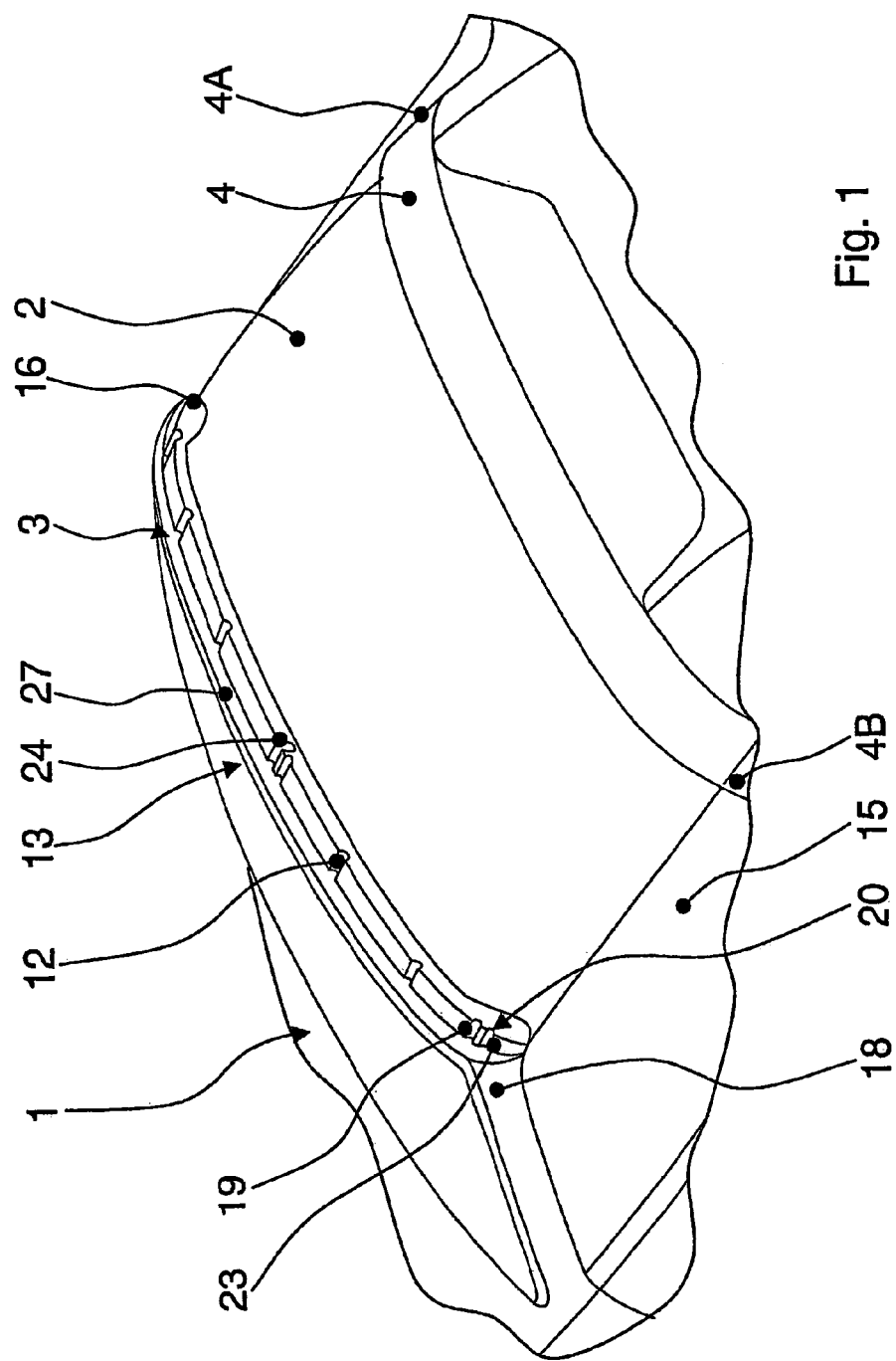

| | | | |
|---|---|---|---|
| 7,354,104 B2 * | 4/2008 | Wezyk et al. | 296/218 |
| 7,506,917 B2 * | 3/2009 | Essig et al. | 296/121 |
| 2005/0134096 A1 * | 6/2005 | Fallis et al. | 296/218 |
| 2007/0063531 A1 * | 3/2007 | Wezyk et al. | 296/107.09 |
| 2007/0257521 A1 * | 11/2007 | Fallis et al. | 296/218 |
| 2007/0296241 A1 * | 12/2007 | Bunsmann | 296/107.09 |
| 2008/0203769 A1 * | 8/2008 | Bunsmann et al. | 296/219 |

FOREIGN PATENT DOCUMENTS

| | | |
|---|---|---|
| DE | 196 13 892 A | 10/1997 |
| DE | 100 42 491 A | 3/2002 |
| FR | 1 465 426 A | 1/1967 |

* cited by examiner

SOFT TOP FOR A MOTOR VEHICLE

The invention relates to a soft top for a motor vehicle which has longitudinal struts that span a roof opening, a flexible roof skin which spans the width of the vehicle and is, when mounted, fastened in the front to a windshield frame and in the rear to a bar that spans the width of the vehicle, and can be folded to put the top down.

For motor vehicles with a roof opening between a windshield frame and a rear bar developed as a rollover bar, which are also called "Targa" vehicles, soft tops that can be removed manually from the roof opening are already known.

With many of the known soft tops for these vehicles, it is first necessary to span cross- and longitudinal convertible top bows over the roof opening before spanning the soft top over the roof opening by pulling a fabric roof skin over said bows and fastening it to lateral vehicle elements.

However, this type of assembly and disassembly of a soft top requires a number of steps and, because of the great number of parts, bears the additional risk that an element of the soft top may be inadvertently left out during the assembly and disassembly or gets lost over the course of time.

DE 1 580 535 B describes a soft top that essentially forms a unit and is detachably fastened to a rollover bar that spans over the passenger space of the motor vehicle, with the mounting at the frame of the windshield being rigid and the mounting at the rollover bar being elastic. This soft top is formed by lateral rails and reinforcements connecting the rails, which span over the passenger space in transversal direction of the vehicle when assembled, as well as by a flexible roof material spanned over the same.

With this solution, it is disadvantageous that the unfolding of the soft top in longitudinal direction of the vehicle over the roof opening and the connection of the soft top and the windshield frame and/or the rollover bar, where the soft top is mounted with one each front transversal reinforcement and/or a rear transversal reinforcement with plug- and joggle joints, requires a very high effort.

Furthermore, this known soft top has the disadvantage that although it can be partially folded in a z-like fashion in its longitudinal direction when disassembled, its foldability is limited and even when folded, the soft top requires a relatively large storage space.

U.S. Pat. No. 3,348,877 describes a removable soft top having a flexible roof skin, with the roof skin running up to the breastwork of the vehicle and thus simultaneously developing side windows. In an area in the center of the vehicle, elastic, bow-like elements are arranged in receptacles at a windshield frame and a rear Targa bar, and when spanned, the flexible roof material runs over and is centered by said elements. To take down the roof, the soft top is folded in a z-like fashion from each side of the vehicle toward the center and then removed as a unit.

However, this type of soft top has the disadvantage of having a very low stability, and a so-called balloon-effect can be expected in particular toward the sides of the vehicle. Furthermore, with this known solution, the kinematics for assembly or disassembly at the roof opening proves difficult to handle.

DE 100 42 491 A1 discloses a removable folding top for a vehicle which can be stored economically by folding it in transversal direction of the vehicle. Said folding top for a vehicle has a flexible flat material and longitudinal struts, some of which form longitudinally running side edges of the folding top. The remaining longitudinal struts run in transversal direction of the folding top and, after the folding top is spanned before inserting it into a folding top cutout in the rigid top of the vehicle, can be spanned between transversal edges of the folding top cutout. Rod arrangements with over-center function are used for the spanning.

Because the folding top already has to be transformed from being folded in an accordion-type fashion into a spanned condition prior to mounting it to the roof opening and because it can be inserted into the roof opening only when in said spanned condition, the folding top represents an awkward unit that is particularly difficult to handle for users of slight stature. Furthermore, the requirement of lateral longitudinal roof supports severely limits the freedom of design for the vehicle because the folding top cannot be inserted into vehicles without longitudinal roof supports, as is the case, for example, with the Targa vehicles.

Therefore, the present invention was based on the problem of creating a soft top for a motor vehicle which is easy to handle, leaves great creative freedom in the design of the roof opening of the motor vehicle, and allows for a stable covering of the roof opening.

The object of the invention is attained with a soft top for a motor vehicle having longitudinal struts that span a roof opening and a flexible roof skin that spans the width of the vehicle. In assembled condition, said soft top is fastened at the front side to a windshield frame and at the rear side to a bar that spans the width of the vehicle, with the roof skin and the longitudinal struts being connected into a preassembled unit that can be folded in transversal direction of the vehicle to put the top down, and with each respective longitudinal strut that delimits the roof skin in transversal direction of the vehicle being developed a lateral rail that can be connected to at least one lateral vehicle element.

This type of soft top can be operated manually and has integrated lateral rails to represent a unit comprised of few individual parts which is easy to handle. The roof opening can be opened and covered in next to no time, with the soft top developed in accordance with the invention offering a high degree of stability.

Furthermore, the soft top in accordance with the invention can be folded into a compact unit in transversal direction of the vehicle and requires little storage space.

To increase the stability of the soft top when it is fastened to the roof top, at least one and preferably a plurality of the longitudinal struts may be developed as longitudinal convertible top bows, which further stabilize the roof skin.

It is advantageous if at least one longitudinal bow, which is preferably arranged in the center of the vehicle, is held by a locking means in an associated receptacle at the windshield frame because this prevents the so-called "ballooning" when the vehicle travels at a high speed.

Other advantages and advantageous embodiments of the soft top in accordance with the invention can be found in the description, the drawing and the patent claims.

Figure 2:
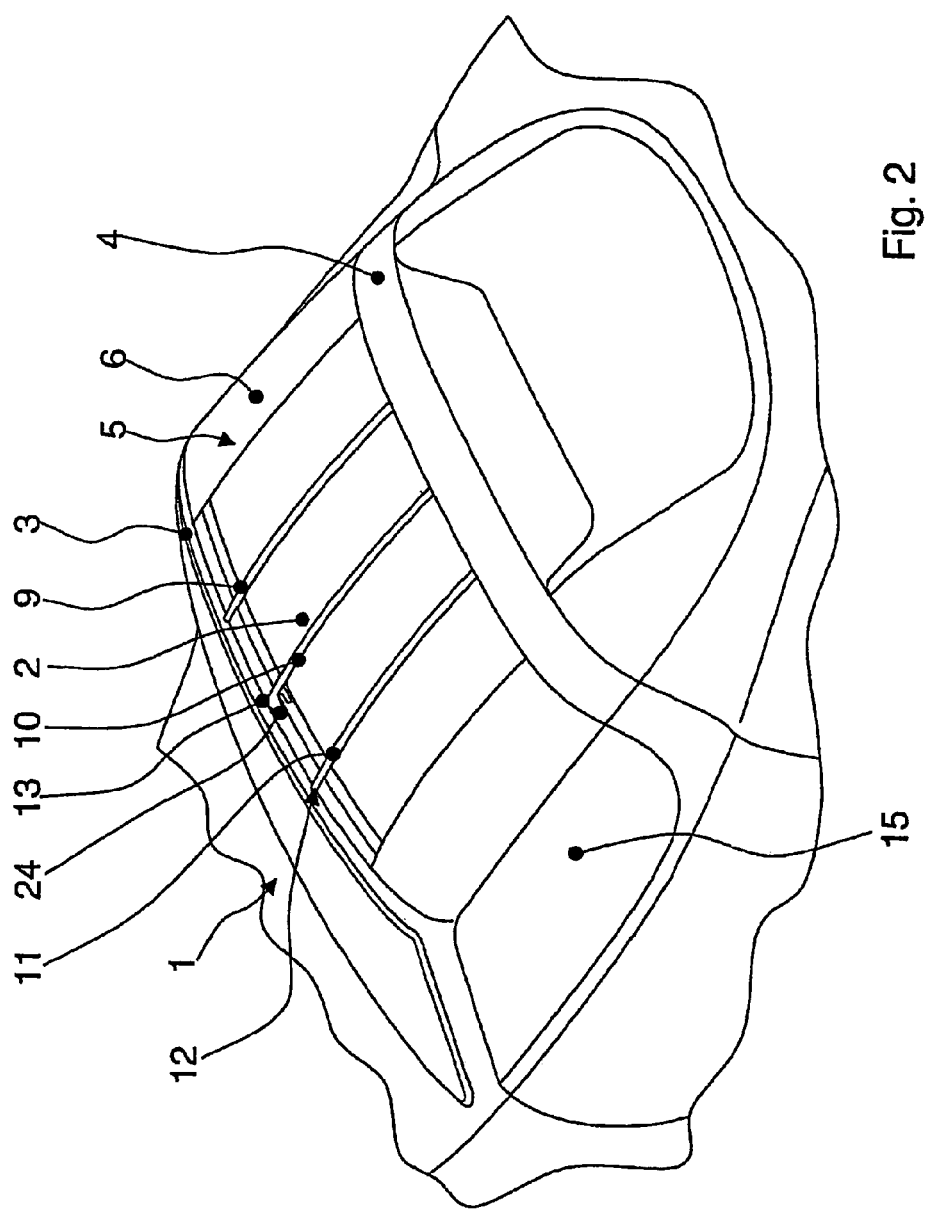

An embodiment of the soft top in accordance with the invention is represented in a schematically simplified manner in the drawing and explained in greater detail in the following description:

Shown are:

Ill. 1 a sectional three-dimensional view of a motor vehicle in Targa-construction with a roof opening designed to mount a soft top in accordance with the invention;

Ill. 2 the roof opening in accordance with FIG. 1 with an installed soft top, with only a part of a textile roof skin being shown to better represent the structure;

Ill. 3 the roof opening and the soft top in accordance with FIG. 2 while the soft top is being spanned over the roof opening;

Ill. 4 a schematic cross-section through a driver-side half of the soft top in accordance with Ill. 1 to 3 transversely to the direction of travel in an installation step;

Ill. 5 the soft top in a representation according to Ill. 4 in another installation step; and Ill. 6 a detailed view of a hook element on a longitudinal convertible top bow of the soft top in accordance with Ill. 1 to Ill. 5 in a cross-sectional representation.

Ill. 1 to Ill. 3 each show a section of a motor vehicle 1 from a lateral perspective, which is [based on] a Targa vehicle having a roof opening 2 between a windshield frame 3 and a rear bar 4, which is in this case serves as a rollover bar and spans a passenger cell across the width of the vehicle.

To cover the roof opening 2, a soft top 5 is provided for installation between the windshield frame 3 and the rollover bar 4. Said soft top represents a preassembled unit comprised of a plurality of longitudinal struts 7 to 11 and a flexible roof skin 6, which spans over said struts when they are mounted on the roof opening 2. Each of the longitudinal struts 7 to 11 which delimits the roof skin 6 in the transversal direction of the vehicle forms a lateral rail 7 and/or 8, with a first lateral rail 7 being designed to connect to the lateral elements of the vehicle on a passenger side of the motor vehicle and the second lateral rail 8 being designed to connect to lateral elements of the vehicle on the driver side of the motor vehicle 1.

Between the lateral rails 7 and 8, a plurality of longitudinal convertible top bows 9, 10, 11 is provided as additional longitudinal struts, which stabilize the roof skin when fastened and can be placed on respectively aligned receptacles 12, 13, with said receptacles 12, 13 being developed in a groove-like fashion.

The longitudinal convertible top bows 9, 10, 11 are preferably developed differently with respect to their bending properties to ensure an optimum flow behavior of the soft top 5.

In the shown embodiment, the lateral rails 7, 8 are developed in double sheet metal concept and each support a lateral gasket 14 which, when the top is installed, cooperates as a seal with a laterally adjacent element of the vehicle, in particular a side windshield 15.

To connect to the lateral elements of the vehicle on the passenger side, which in the present case appropriately represent in the front the windshield frame 3 in the area of a passenger-side A-column 16 and in the rear a lateral leg 4A of the rollover bar 4, a constructively simple catch-slot connection is used, with a nose being provided at the face areas of the first lateral rail 7 and a curved groove being provided at the A-column 16 and the corresponding leg 4A of the rollover bar 4 and the respective inserted nose engaging into said groove when the soft top 5 is spanned into the transversal direction of the vehicle.

The second lateral rail 8 on the driver side is rotatably mounted around a pivot axis 17 at its connecting location to the assigned driver-side lateral elements of the vehicle, which in the present case are an A-column 18 on the driver side and a leg 4B of the rollover bar 4 at the driver side, as is shown in particular by the illustrations 4 and 5. If the preassembled unit of the soft top 5 is unfolded over the roof opening 2 after the first lateral rail 7 has been fastened on the passenger side, the lateral rail 8 on the driver side is inserted into a groove 19 in a rotating element that forms the pivot axis 17 and then pivoted downward manually in assembled condition so that it creates a latch connection 20 with the latch elements and the assigned lateral elements of the vehicle.

In said swivel motion, which is indicated by an arrow 21 in Ill. 4, a spring-loaded pin 22, which forms the latch connection 20, latches into a corresponding recess 12 and thus secures the lateral rail 8 on the driver side in a simple manner.

During the manual unfolding and/or placing of the soft top 5 over the roof opening 2, the longitudinal convertible top bows 9, 10, 11, each of which are enclosed in a loop- or pocket-like fashion by the flexible roof skin 6, automatically enter their assigned groove-like receptacles 12, 13.

Figure 6:
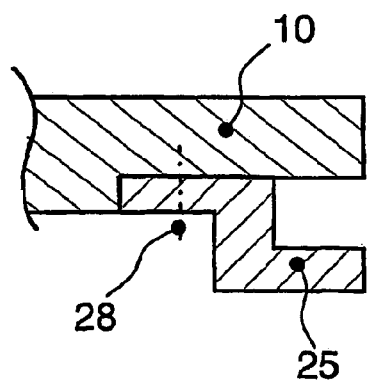

To avoid a ballooning when driving at rapid speed, a locking means 24 is provided for the center longitudinal convertible top bow 13 at its windshield-side receptacle 24, with said locking arrangement 24 being formed by an at least approximately L- and/or C-shaped cross-section of the receptacle 13 and a hook element 25 designed to engage therewith, as shown in detail in FIG. 6.

In the present embodiment, said hook element 25 is developed as a separate, approximately L-shaped component which is fastened to a truncated end area of the assigned longitudinal convertible top bow 10 by means of a threaded assembly 28. When the soft top 5 is spanned across the width of the vehicle, the hook 25 engages in the L- and/or C-shaped receptacle 13 and dependably prevents any lifting of the longitudinal convertible top bow 13.

It goes without saying that in a modified embodiment, it is also possible to provide a one-piece development of the longitudinal convertible top bow and the hook element or any other known type of fastening as well as a different hook element.

Figure 3:
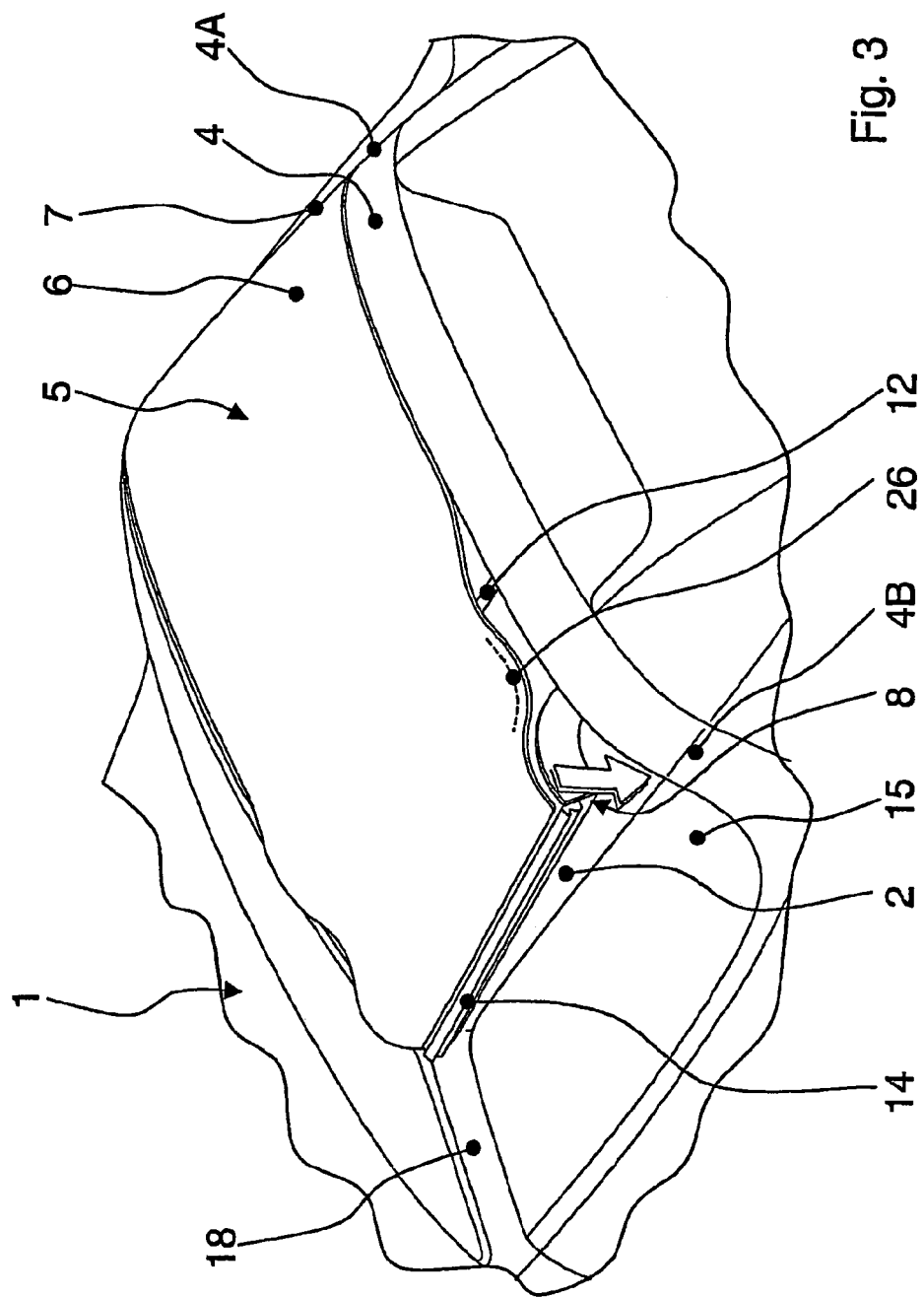
Figure 4:
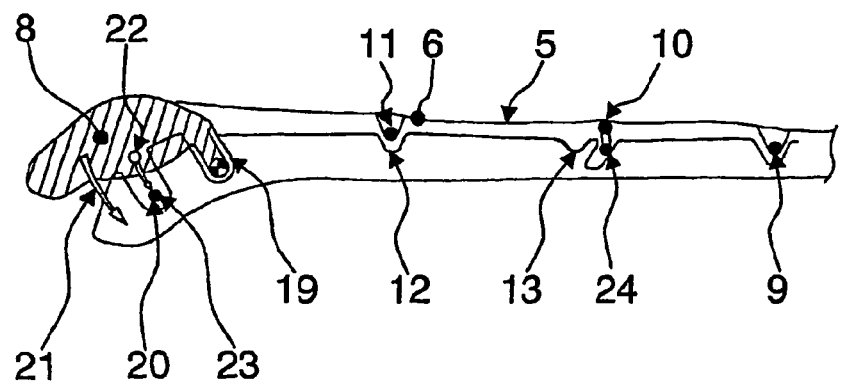
Figure 5:
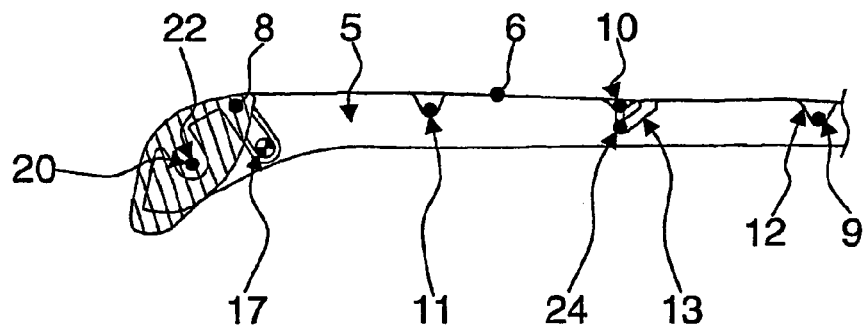

To seal the soft top 5, the roof skin 6 has in the contact area at the windshield frame 3 and at the rollover bar 4 a tensioning rope 26, which is indicated in dashed lines in FIG. 3. When said tensioning rope has been fastened, it cooperates with a sealing means at the windshield frame 3 and the rollover bar 4, which in the simplest case represents a sealing tape 27.

To uninstall the shown soft top 5, it is folded up or rolled up in transversal direction of the vehicle as a unit.

In the shown preferred embodiment, the unit of the soft top 5 represents a rolling body, with the lateral rail 7 on the passenger side forming an outer end of the roll and the lateral rail 8 on the driver side forming an inner end of the roll.

It goes without saying that in the same way as the soft top can be folded up in various ways, i.e., folded or rolled, the opposite setup of the soft top, i.e., proceeding from the lateral rail 8 on the driver side, is also possible.

REFERENCE SYMBOLS 1 motor vehicle
2 roof opening
3 windshield frame
4 bar, rollover bar
4A lateral leg of bar
4B lateral leg of bar
5 soft top
6 roof skin
7 lateral rail
8 lateral rail
9 longitudinal convertible top bow
10 longitudinal convertible top bow
11 longitudinal convertible top bow
12 receptacle
13 receptacle
14 lateral gasket
15 side window
16A A-column
17 pivot axis
18 A-column
19 groove 20 latch connection
21 arrow
22 tip
23 recess
24 locking means
25 hook element
26 tensioning rope
27 sealing tape
28 threaded assembly

The invention claimed is:

1. Soft top for a motor vehicle, comprising longitudinal struts (7 to 11) that span a roof opening (2) and a flexible roof skin (6) that spans, when mounted, the width of the vehicle and is fastened to a windshield frame (3) in the front and a bar (4) spanning the width of the vehicle in the rear, with the roof skin (6) and the longitudinal struts (7 to 11) being connected into a preassembled unit that can be folded or rolled in transversal direction of the vehicle for removing the top, characterized in that each respective longitudinal strut (7, 8) that delimits the roof skin (6) in the transversal direction of the vehicle is embodied as a lateral rail which can be connected to at least one lateral vehicle element (4A, 4B, 16, 18), with the pre-assembled unit being placeable across the roof opening (2) by fastening a first lateral rail (7) to its associated lateral vehicle elements (4A, 16) above a lateral window and by placing the second lateral rail (8) in transversal direction of the vehicle over the roof opening (2) up to a connecting point with the assigned lateral vehicle elements (4B, 18) above a lateral window (15) and attaching it to the same, and that one or more longitudinal struts are formed as longitudinal convertible top bows (9, 10, 11) that stabilize the roof skin (6), and are arranged for engagement with aligned receptacles (12, 13) which are formed in a groove-like fashion in the frame of the windshield (3) and at the rear bar (4) and at least one receptacle (13) for at least one longitudinal convertible top bow (10) is formed with a locking means (24) that holds the longitudinal convertible top bow (10) in assembled condition, wherein the locking means (24) is formed by an at least approximately L-shaped cross-section of the receptacle (13) and a hook element (25) designed to engage with the associated longitudinal convertible top bow.

2. Soft top in accordance with claim 1, characterized in that at least one longitudinal convertible top bow (10) held by the locking means (24) is arranged in an area in the center of the vehicle.

3. Soft top in accordance with claim 1, characterized in that the roof skin (6) encloses each respective longitudinal convertible top bow (9, 10, 11) in a loop- or pocket-like fashion.

4. Soft top in accordance with claim 1, characterized in that when tensioning the preassembled unit over the roof opening (2), at least one of the longitudinal convertible top bows (9, 10, 11) engages with an assigned receptacle (12, 13).

5. Soft top in accordance with claim 4, characterized in that the first lateral rail (7) can be attached to its assigned lateral vehicle elements (4A, 16) by means of a catch-slot connection.

6. Soft top in accordance with claim 4, characterized in that the second lateral rail (8) can be rotatably mounted to rotate around a pivot axis (17) at the assigned lateral elements of the vehicle (4B, 18) to tension the roof skin (6), and it can be connected to the lateral elements of the vehicle (4B, 18) through a latch connection (20).

7. Soft top in accordance with claim 1, characterized in that the frame of the windshield (3) forms a lateral element of the vehicle which can be connected to the lateral rail (7, 8) in the front in the area of an A-column (16, 18) and the rear bar (4) forms an element of the vehicle that can be connected to the lateral rails (7, 8) in rear area.

8. Soft top in accordance with claim 1, characterized in that the preassembled unit, when placed on the roof opening (2), forms an unrolled rolling body, with one of the lateral rails (7) constituting an outer roll end of the roll body.

9. Soft top for a motor vehicle, comprising longitudinal struts (7 to 11) that span a roof opening (2) and a flexible roof skin (6) that spans, when mounted, the width of the vehicle and is fastened to a windshield frame (3) in the front and a bar (4) spanning the width of the vehicle in the rear, with the roof skin (6) and the longitudinal struts (7 to 11) being connected into a preassembled unit that can be folded or rolled in transversal direction of the vehicle for removing the top, characterized in that each respective longitudinal strut (7, 8) that delimits the roof skin (6) in the transversal direction of the vehicle is embodied as a lateral rail which can be connected to at least one lateral vehicle element (4A, 4B, 16, 18), with the pre-assembled unit being placeable across the roof opening (2) by fastening a first lateral rail (7) to its associated lateral vehicle elements (4A, 16) above a lateral window and by placing the second lateral rail (8) in transversal direction of the vehicle over the roof opening (2) up to a connecting point with the assigned lateral vehicle elements (4B, 18) above a lateral window (15) and attaching it to the same, and that one or more longitudinal struts are formed as longitudinal convertible top bows (9, 10, 11) that stabilize the roof skin (6), and are arranged for engagement with aligned receptacles (12, 13) which are formed in the frame of the windshield (3) and at the rear bar (4), characterized in that the roof skin (6) has a tensioning rope (26) in a contact area to the frame of the windshield (3) and/or at the rear bar (4), which engages and acts as a seal with a sealing means (27) arranged at the frame of the windshield (3) and/or at the rear bar (4) in assembled condition.

* * * * *